(12) United States Patent
Lewit et al.

(10) Patent No.: US 6,911,252 B2
(45) Date of Patent: *Jun. 28, 2005

(54) STRUCTURAL FRAMING MEMBERS WITH INTEGRATED FLOW CHANNELS AND METHOD OF MAKING SAME

(75) Inventors: Scott M. Lewit, Indialantic, FL (US); Keith G. Johnson, Indialantic, FL (US)

(73) Assignee: Compsys, Inc., West Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/066,827

(22) Filed: Feb. 4, 2002

(65) Prior Publication Data

US 2003/0148090 A1 Aug. 7, 2003

(51) Int. Cl.[7] .............................. B32B 3/26; B63B 5/24
(52) U.S. Cl. ................. 428/316.6; 428/304.4; 428/306.6; 428/308.4; 428/71; 428/74; 428/76; 114/357
(58) Field of Search ................................. 428/304.4, 74, 428/76, 308.4, 309.9, 316.6, 306.6, 71; 114/357

(56) References Cited

U.S. PATENT DOCUMENTS

| | | | | |
|---|---|---|---|---|
| 3,703,739 A | * | 11/1972 | Young et al. ............ | 15/230.17 |
| 5,262,230 A | * | 11/1993 | Becker et al. ................ | 442/59 |
| 5,429,066 A | | 7/1995 | Lewit et al. | |
| 5,622,660 A | * | 4/1997 | Uemura et al. ............ | 264/29.2 |
| 5,664,518 A | | 9/1997 | Lewit et al. | |
| 5,800,749 A | | 9/1998 | Lewit et al. | |
| 6,497,190 B1 | * | 12/2002 | Lewit ......................... | 114/357 |
| 6,755,998 B1 | * | 6/2004 | Reichard et al. ........... | 264/46.5 |

OTHER PUBLICATIONS

"Alternative Approaches to Closed Molding Infusion," Composites Fabrication, Sep. 2001, Scott Lewit.

* cited by examiner

*Primary Examiner*—Hai Vo
(74) *Attorney, Agent, or Firm*—Sacco & Associates, PA (57) ABSTRACT

The invention concerns a composite part, comprising an elongated foam core and a flow channel media attached to a first elongated side thereof. The flow channel media forms interstices for the passage of resin. At least one fabric layer is secured to the elongated foam core, and encloses a first elongated side of the foam core, including the flow channel media. In this way, a resin flow path is defined along the first elongated side. The fabric layer can further enclose at least a second and third elongated side of the foam core where, where each of the second and third elongated sides adjoin the first elongated side. Fabric tab portions can be provided extending from the second and third elongated sides for aiding in the installation of the composite part in a larger composite structure.

19 Claims, 5 Drawing Sheets

STRUCTURAL FRAMING MEMBERS WITH INTEGRATED FLOW CHANNELS AND METHOD OF MAKING SAME

BACKGROUND OF THE INVENTION

1. Technical Field

The invention relates generally to the field of composite structures, and more particularly to the framing members with integrated flow channels for use in certain manufacturing processes.

2. Description of the Related Art

A variety of manufacturing techniques are known for assembling composite structures. For example, the spray lay-up method has been used for many years with good success. In spray lay-up systems, chopped fiber together with a catalyzed resin is sprayed directly into an open mold. Structural reinforcing members such as stringers can be positioned in the mold prior to the application of the chopped fiber and resin for improving the overall strength and rigidity of the structure. For example, U.S. Pat. Nos. 5,429,066, 5,800,749 and 5,664,518 to Lewit et al. describe various types of reinforcing members that can be used for this purpose. The fiber, resin and stringers applied in this way are then left to cure.

Recently, environmental concerns have encouraged the development of new closed mold manufacturing processes intended to limit the release of potentially harmful chemicals. These include resin transfer molding (RTM), vacuum assisted resin transfer molding (VARTM), and other similar processes in which fabrics are laid up in a mold as a dry stack of materials and then sealed in a mold or vacuum bagged. Resin is then allowed to flow into the dry stack of materials forming a laminate. Disposable tubing can be used exterior to the mold or vacuum bag for facilitating the injection of resin at desired locations.

One issue with closed mold manufacturing techniques involves the problem of ensuring adequate resin distribution over the whole laminate sufficiently quickly before the resin has cured substantially. In some closed mold systems, resin flow is aided by the use of a knitted type of non-structural fabric which is included in laminate specifically for this purpose. However, the additional labor and cost of materials with these approaches are such that the simple addition of non-structural fabric to the laminate has not entirely solved the problem of ensuring fast and complete distribution of resin. Accordingly, it would be desirable to provide a method and system for integrating a resin flow mechanism in composite structure manufacturing processes that minimizes the need for non-reusable external processing components (such as disposable tubing), and provides consistent results with only a minimal amount of additional time, labor and cost.

SUMMARY OF THE INVENTION

The invention concerns a composite part, comprising an elongated foam core and a flow channel media attached to a first elongated side thereof. The flow channel media forms interstices for the passage of resin. At least one fabric layer is secured to the elongated foam core, and encloses a first elongated side of the foam core, including the flow channel media. In this way, a resin flow path is defined along the first elongated side. The fabric layer can further enclose at least a second and third elongated side of the foam core where, where each of the second and third elongated sides adjoin the first elongated side. Fabric tab portions can be provided extending from the second and third elongated sides for aiding in the installation of the composite part in a larger composite structure.

One more secondary flow channel can also be integrated into the composite part. In this regard, a flow channel media can also be attached to the elongated foam core and extend along a second elongated side thereof. As with the first flow channel media, the second flow channel media has interstices for the passage of resin therethrough. A fabric layer can enclose the second elongated side of the foam core, including the second flow channel media, to define a second resin flow path along the second elongated side. According to one aspect of the invention, the second elongated side can be opposed from the first elongated side.

The flow channel media as described herein can be bounded by another fabric layer interposed between the foam core and the flow channel media. That fabric layer can be a substantially closed fabric i.e., with low porosity for preventing a passage through the second fabric of foam into the flow channel media. The flow channel medium can be a plastic mesh with a large volume of open spaces between the fibers defining the mesh.

The invention also concerns a method of making a composite part with an integrated flow channel. The method or process involves 1) arranging a fabric layer in a configuration constrained against outward movement and defining a cavity between opposing surfaces thereof, 2) arranging a flow channel media adjacent at least one of the opposing surfaces, 3) dispensing a predetermined amount of a self-expanding, self-curable, uncured structural foam into the cavity, and finally freeing the cured composite structure from the constraint of the arranging step. The fabric layer can be selected from the group consisting of glass fiber, carbon fiber, aramid fiber, linear polyethylene or polypropylene fiber, and polyethylene fiber.

Alternatively, the fabric may be polyester staple mat, glass fiber mat, organic fiber mat or inorganic fiber mat. The structural foam used herein for the foam core can be a two-part, self-expanding, self-curing polyurethane foam. The molding pressure of the foam can be controlled so that the foam penetrates at least partially into interstices of the fabric layers as it expands and cures.

DETAILED DESCRIPTION

Figure 1:
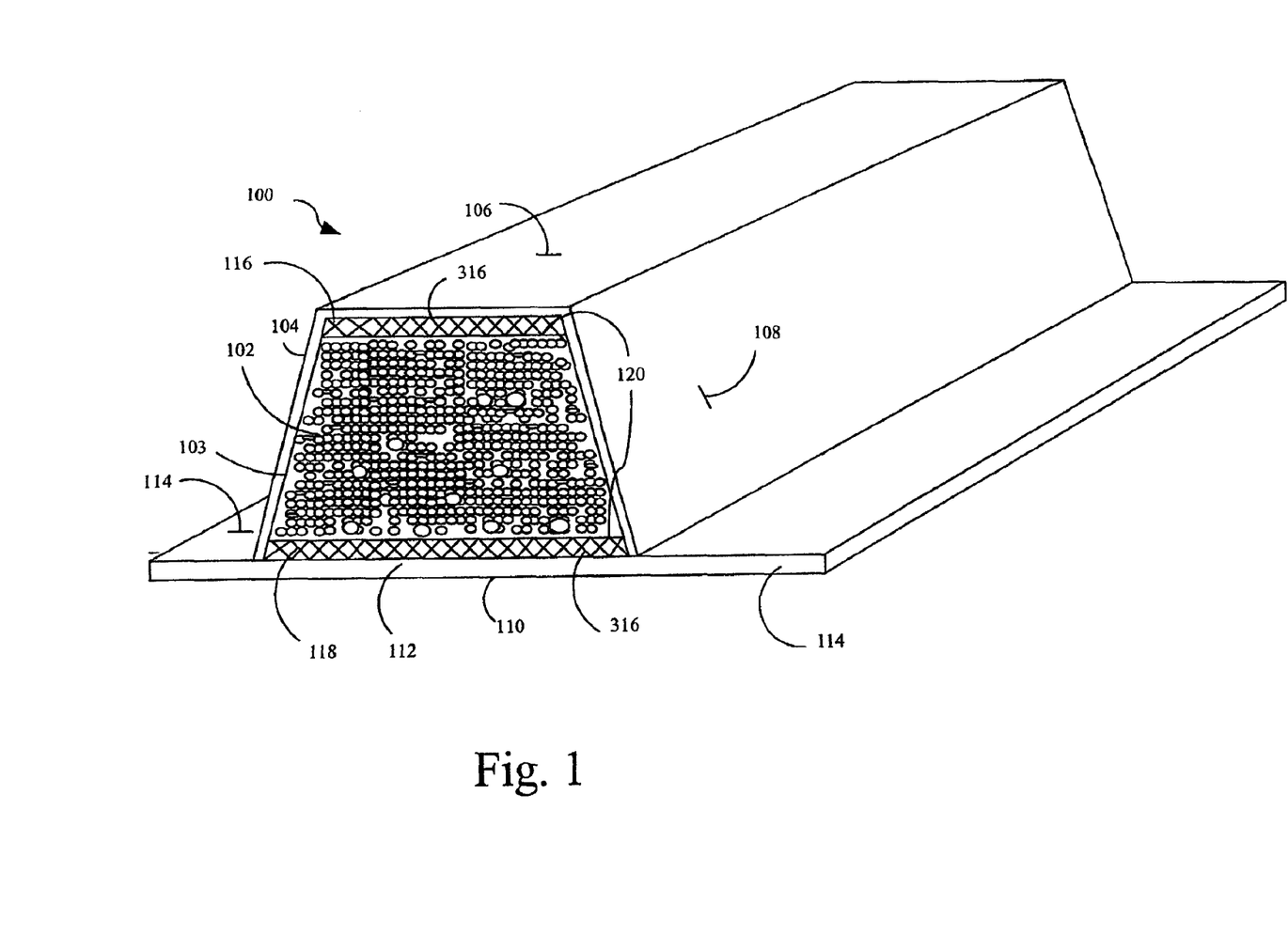
FIG. 1 is a drawing useful for illustrating the structure of a composite part as described and claimed herein.

FIG. 1 is a drawing useful for explaining the composite part according to a preferred embodiment of the invention. Composite part 100 comprises an elongated foam core 102 and a flow channel 316 formed by flow channel media 116 attached thereto along a first elongated side 106. A fabric layer 103 is secured to the elongated foam core 102 and encloses at least the elongated side 106 of the foam core 102. In this way, the fabric layer 103 and the flow channel media 116 define a resin flow path along the elongated side 106 of the composite part 100.

One or more additional flow channels can be provided on other elongated sides 104, 108, 110 of the composite part 100. According to a preferred at least a second flow channel can be provided along a side 110 of the composite part 100 forming a base thereof and opposed from the flow channel media 116. The second flow channel is comprised of a flow channel media 118 and can be enclosed by fabric layer 103 or a separate fabric layer 112. Further, it will be appreciated that the flow channel media does not necessarily need to be positioned adjacent a top or bottom side of the part 100. Instead, the flow channel media can be placed as dictated by a particular resin flow requirement. For example, the flow channel media can be placed spaced apart from opposing sides 106, 110 of the part 100 with structural foam 102 above and below the flow channel media.

The composite part 100 can further comprise fabric tab portions 114 extending from elongated sides 104, 108 along a portion thereof adjacent to the bottom or base side 110. The tab portions are useful for securing the composite part in a larger structure as shall hereinafter be described.

According to one embodiment, the foam core can be a structural foam. For example, a a two-part, self-expanding, self-curing urethane foam has been found to work well for this purpose. The fabric layers 103, 112 can be comprised of organic or inorganic fibers. For example the fabric layers 103, 112 can be woven glass fiber, carbon fiber, aramid fiber, linear polyethylene or polypropylene fiber, or polyethylene fiber. Alternatively, the fabric layer can be a non-woven fabric such as polyester staple mat, glass fiber mat, organic fiber mat or inorganic fiber mat. Of course, those skilled in the art will appreciate that the fabric layers 103, 112 can each be formed of multiple layers of fabric, such as a combination of woven and non-woven fabric layers. These fabric layers can be attached to one another by any suitable means.

The flow channel media 116, 118 can be formed of any material not susceptible to chemical attack by liquid molding resin or urethane foam. For example, the flow channel media can preferably be a mesh material formed of polyester, nylon or high density polyethylene. However, those skilled in the art will recognize that any other suitable material, such as a wide variety of plastics, can be used for this purpose provided that they are not susceptible to chemical attack by either resin or foam as used in the fabrication of the composite structures as described herein. In any case, the flow channel media material preferably defines a substantial number of interstices or openings therein facilitating the passage and channeling of resin through the flow channel media with less resistance as compared to the fabrics layers 120, 103 and 112. The mesh material forming the flow channel media can be a three-dimensional matrix of fibers joined at the intersections thereof. According to a preferred embodiment about 50 to 95% of the matrix is open space. In this way, resin introduced under pressure will tend to flow through the flow channel 116, 118 substantially along the elongated sides of the composite part 100.

Figure 2:
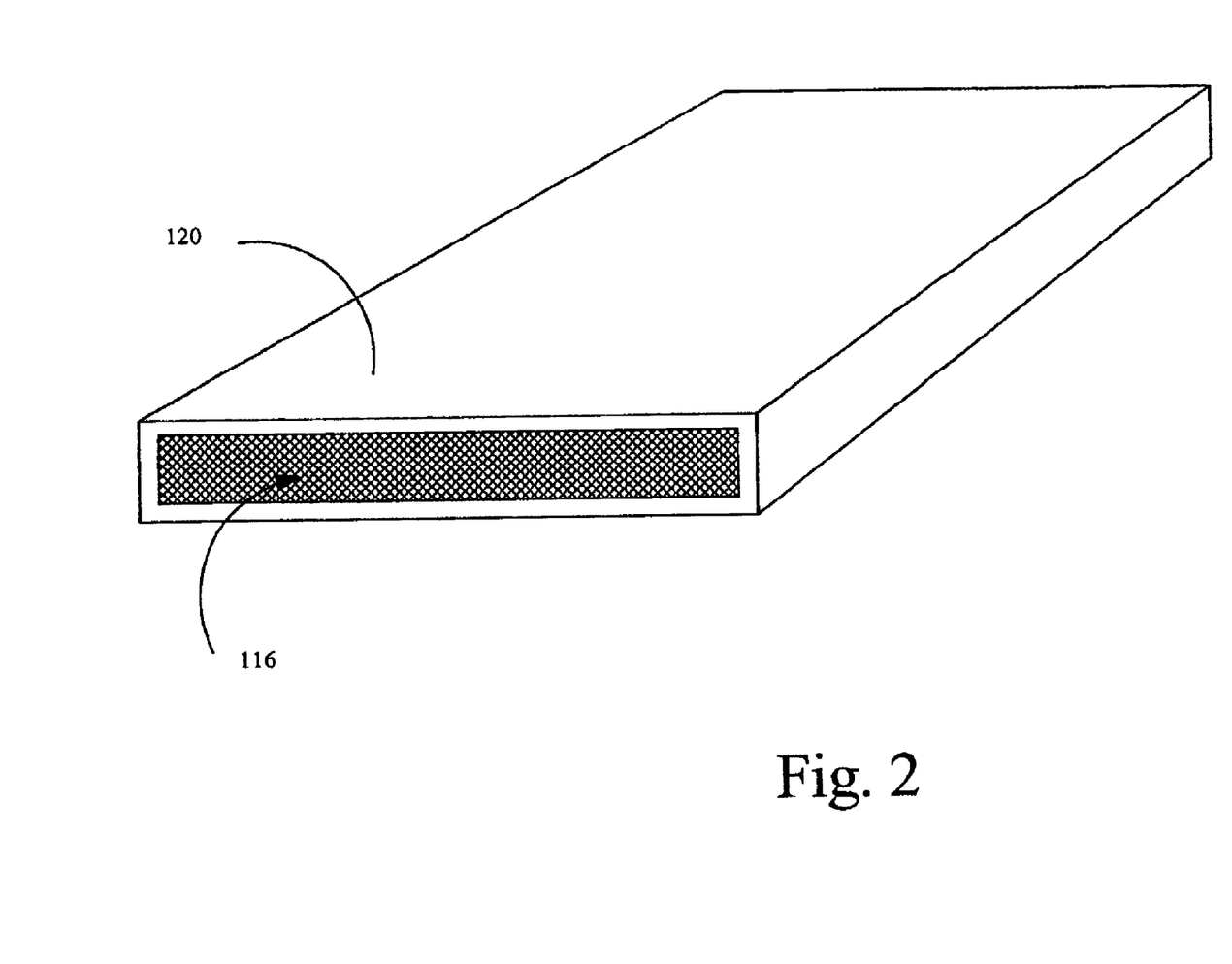
FIG. 2 is a drawing useful for illustrating the structure of a flow channel media and fabric covering.

The flow channel media is preferably bounded by a fabric layer 120 interposed between the foam core 102 and the flow channel media 116, 118. For example, the flow channel media 116, 118 can be arranged as shown in FIG. 2, encased within the fabric layer 120. The fabric layer can be comprised of a non-woven filter fabric made of materials such as polyester staple mat, glass fiber mat, organic fiber mat or inorganic fiber mat. The fabric layer 120 is useful in this arrangement for preventing the foam core from substantially penetrating into the interstices defined by the flow channel media 116, 118. However, the fabric layer 120 is not required and the invention can be used with only the flow channel media 116, 118 and the fabric layers 103, 110 defining the flow channels 316.

According to one embodiment, the flow channel media can be a three-dimensional core of extruded high-density nylon or polyester with a nonwoven filter fabric bonded to one or both sides. A product useful as flow channel media and including and outer fabric layer 120 is know as EnkaFusion™ that is commercially available from Colbond of Sand Hill Road, Enka, N.C. 28728.

According to a preferred embodiment, the fabrics 103, 120, 112 and flow channel media are preferably selected to achieve a controlled volume of channel flow and release of resin from the flow channel media 116, 118. More particularly, although it is desired for resin to pass through the flow channels 316, a certain amount of resin can be advantageously released from the flow channels 316 so as to wet-out the fabric forming fabric layers 103, 112 and tabs 114. In this way, resin can be quickly and efficiently be introduced along the length of the part 100 in a closed mold system.

The fabric layer 120 is also preferably selected with a porosity sufficient to prevent a passage of foam from the foam core 102 through the fabric 120 and into the flow channel media 116, 118. An introduction of excess foam into the flow channel media during the manufacturing process can restrict or prevent the flow of resin through the flow channel 316.

Figure 3:
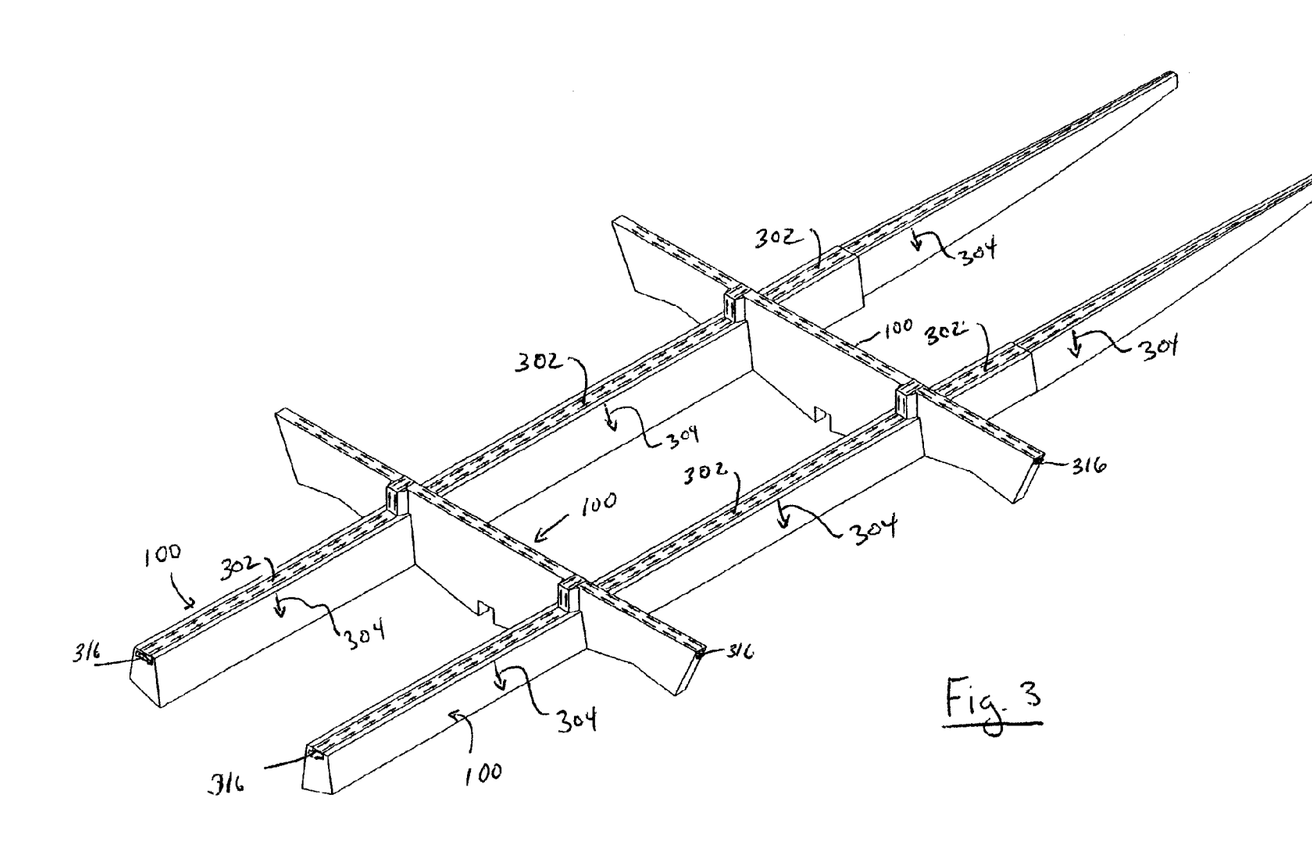
FIG. 3 is a drawing useful for illustrating how the composite parts as described herein can be used in a closed molding process.

FIG. 3 shows a set of composite parts 100 arranged as stringers to form a structural reinforcement for a larger composite article, in this case a boat. The composite parts 100 can be arranged as shown in interlocking fashion. In FIG. 3, tabs 114 are omitted, but the invention is not limited in this regard. As shown in FIG. 3, flow channels 316 are provided as previously described in relation to FIGS. 1 and 2. By way of example, arrows 302 illustrate the direction of resin flow through each of the flow channels. Arrows 304 illustrate how a selectively controlled portion of the resin can be caused to flow down the sides of composite parts 100 to wet out the fabric layers. The amount of resin that flows out of the flow channel in this way can be controlled by selection of the fabric layers enclosing the resin flow channel and the selection of flow channel media. For example, in the composite part in FIGS. 1 and 2, the resin flow out of the flow channel would be determined by fabric layers 103, 120 and flow channel media 116, 118. Flow channel media 116, 118 with greater porosity and a more open mesh structure will create less resistance to resin flow and therefore less tendency for resin to exit the flow channel. Conversely, fabric layers 103, 120 with less porosity will tend to decrease the amount of resin exiting the flow channel 316. Resin flow can be advantageously further controlled by selectively injecting resin at any point along a flow channel. For example, the vacuum bag or mold can be penetrated at one or more selected locations deemed advantageous for improved resin flow, and resin can be injected at that point.

Figure 4:
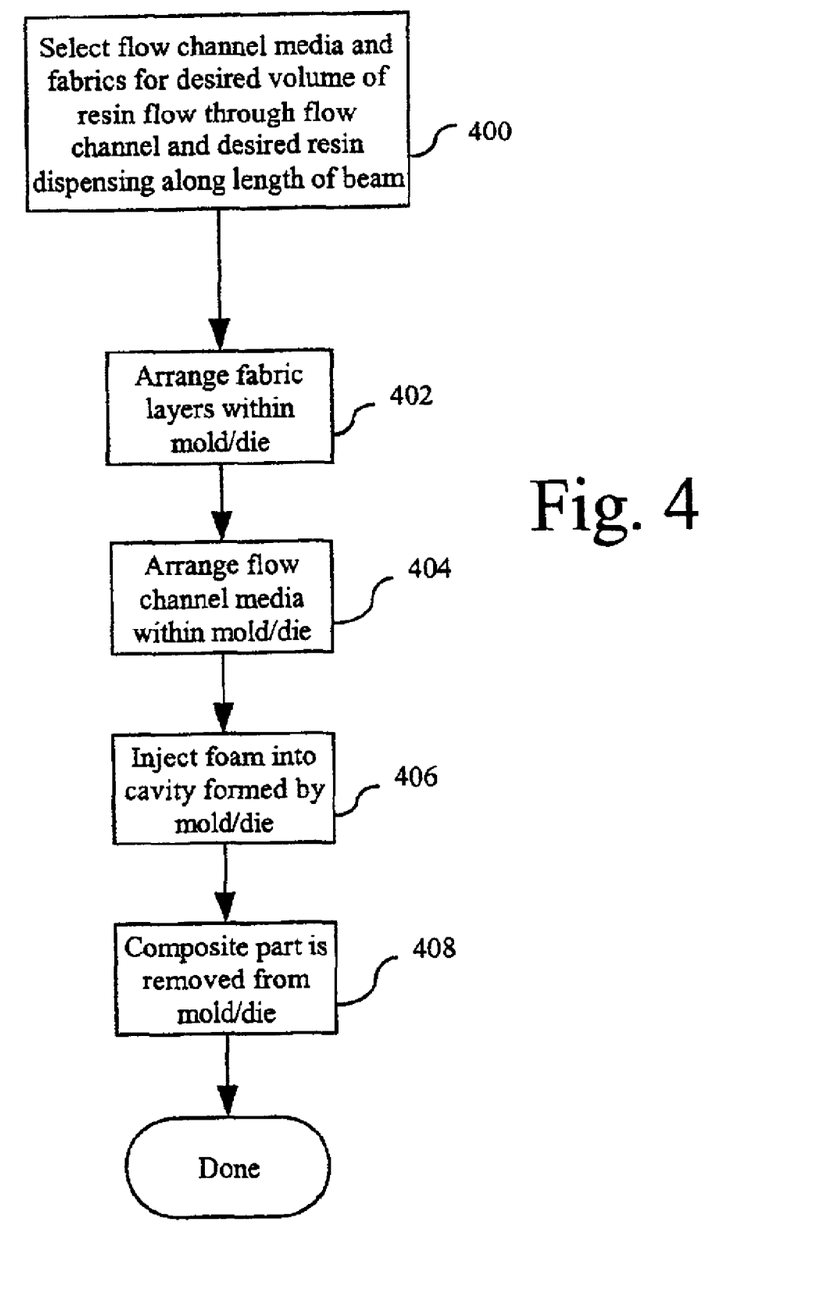
FIG. 4 is a flow chart useful for illustrating a process for manufacturing the composite part of FIG. 1.
Figure 5:
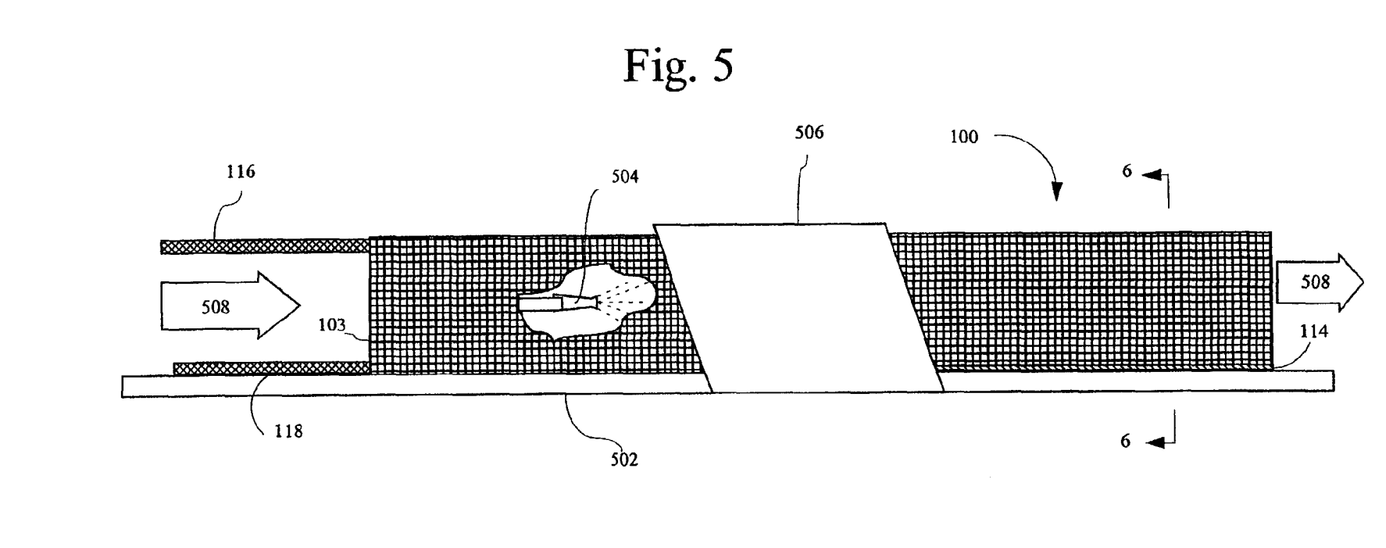
FIG. 5 is a drawing useful for illustrating the process of FIG. 4.
Figure 6:
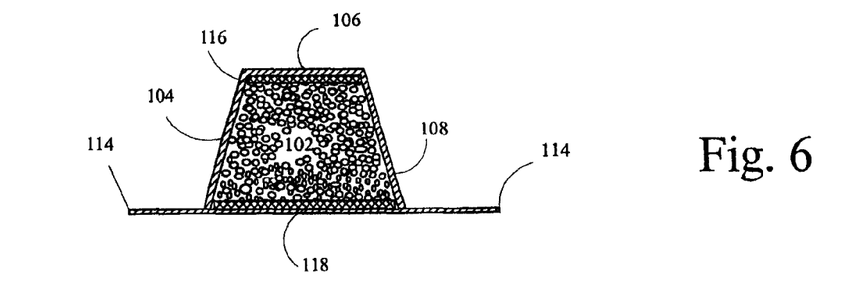
FIG. 6 is a cross-sectional view along lines 6—6 in FIG. 5.

Referring now to FIGS. 4–6, the invention also concerns a method of making a composite part with an integrated flow channel. As illustrated by the flow chart in FIG. 4, the method can begin in step 400 by selecting flow channel media 116, 118 and fabrics 103, 112, 120 for desired volume of resin flow through flow channel 316 and for desired volume of resin dispensing along length of part 100. In step 402, the process continues with the step of arranging a fabric layer 103, 112, 120 in a configuration constrained against outward movement and defining a cavity between opposing surfaces thereof. This arrangement can be achieved in either a simple molding process such as described in U.S. Pat. No. 5,429,066 to or using a continuous manufacturing process where foam, fabric and flow channel media are continuously fed into a die in an arrangement similar to that disclosed in U.S. Pat. No. 5,897,818 to Lewit et al. Each of these issued patents are hereby incorporated herein by reference. However, those skilled in the art will appreciate that the invention is not limited in this regard.

The process continues in step 404 by arranging the flow channel media adjacent at least one of the opposing surfaces of the die or mold. According to a preferred embodiment, a flow channel media 116, 118 can be arranged on opposed surfaces 106 and 112. This can be achieved by simply placing the flow channel media within a mold or feeding a continuous layer of flow channel media 106 to a location along an upper and lower opposed sides of the die. Referring to FIGS. 5 and 6, flow channel media 116, 118 and associated fabrics 103, 112, and 120 can be fed into a die 506 using a conveyor 502 moving in a direction 508. For greater clarity, fabrics 112 and 120 are not shown in FIG. 5.

In step 406, a predetermined amount of a self-expanding, self-curable, uncured structural foam is introduced into the cavity formed by a mold or die. In FIG. 5, the foam is injected into the cavity using a foam spray nozzle 504. According to a preferred embodiment, in step 408 the foam is allowed to expand and cure in the cavity at a molding pressure. The molding pressure will be determined by the predetermined amount of foam introduced into the cavity. Although not essential to the invention, the foam can be allowed to attach itself to the fabric layer and the flow channel media to form the composite structure. According to a preferred embodiment, the foam attaches to the fabric layer 120 rather than directly to the flow channel media 116, 118.

Finally, in step 108 the composite part is removed from the mold or is allowed to pass out of the die as shown on the right side of FIG. 5. According to one embodiment, a molding pressure of the foam is controlled so that it penetrates at least partially into interstices of the fabrics 103, 112, 120 as it expands and cures. However, the invention is not limited in this regard and other molding pressures can also be used.

We claim:

1. A composite part having an integrated flow channel, comprising:
   an elongated foam core;
   at least one fabric layer secured to said elongated foam core and extending along a first elongated side thereof, said fabric layer enclosing an elongated channel between said first elongated side of said foam core and said fabric layer; and
   a flow channel media disposed in said elongated channel, said flow channel media formed of a three dimensional plastic mesh having substantially less resistance to a flow of resin as compared to said fabric layer;
   whereby a resin introduced within said elongated channel under pressure will substantially flow along a length of said elongated side.

2. The composite part according to claim 1 wherein said fabric layer further encloses at least a second and third elongated side of said foam core, each of said second and third elongated sides adjoining said first elongated side.

3. The composite part according to claim 2, further comprising fabric tab portions extending from said second and third elongated sides.

4. The composite part according to claim 1 further comprising a second flow channel media attached to said elongated foam core and extending along a second elongated side thereof, said flow channel media defining interstices for the passage of resin.

5. The composite part according to claim 4 wherein fabric layer encloses said second elongated side of said foam core, including said second flow channel media, to define a second resin flow path along said second elongated side.

6. The composite part according to claim 5 wherein said second elongated side is opposed from said first elongated side.

7. The composite part according to claim 1 wherein said flow channel media is bounded by a second fabric layer interposed between said foam core and said flow channel media.

8. The composite part according to claim 7, wherein said second fabric layer is a substantially closed fabric for preventing a passage through said second fabric of said foam core into said flow channel media.

9. The composite part according to claim 1 wherein said flow channel media is a three-dimensional plastic matrix.

10. The composite part according to claim 9 wherein said flow channel media is between about 50 to 90% open space.

11. The composite part according to claim 1, wherein said fabric layer has a porosity that selectively permits a predetermined amount of resin to escape from said elongated channel along said elongated length.

12. The composite part according to claim 1, wherein said elongated channel is disposed exclusively along said first elongated side.

13. The composite part according to claim 1, wherein said flow channel media is disposed exclusively along said first elongated side.

14. A composite part having an integrated flow channel, comprising;
   an elongated foam core;
   a flow channel media attached to said elongated foam core and extending along a first elongated side thereof, said flow channel media defining interstices for the passage of resin;
   at least one fabric layer secured to said elongated foam core, and enclosing said first elongated side of said foam core, including sold flow channel media, to define a resin flow path along sold first elongated side; and
   wherein said flow channel media is bounded by a second fabric layer interposed between said foam core and said flow channel media.

15. A composite part having an integrated flow channel, comprising:
   an elongated foam core;
   at least one fabric layer secured to said elongated foam core and extending along a first elongated side thereof, said fabric layer at least partially enclosing an elongated channel between said first elongated side of said foam core and said fabric layer;
   a flow channel media disposed in said elongated channel, said flow channel media having less resistance to a flow of resin as compared to said fabric layer, and
   wherein said flow channel media is bounded by a second fabric layer interposed between said foam core and said flow channel media.

16. The composite part according to claim 15, wherein said flow channel media has less resistance to a flow of resin as compared to said second fabric layer.

17. The composite part according to claim 15, wherein said flow channel media is a three-dimensional plastic matrix of fibers joined at the intersections thereof.

18. The composite part according to claim 15, wherein said flow channel comprises between about 50% to 90% open space.

19. The composite part according to claim 15, wherein said fabric layer has a porosity that selectively permits a predetermined amount of resin to escape from said elongated channel along said elongated length.

* * * * *

UNITED STATES PATENT AND TRADEMARK OFFICE
CERTIFICATE OF CORRECTION

PATENT NO.   : 6,911,252 B2
DATED        : June 28, 2005
INVENTOR(S)  : Lewit et al.

It is certified that error appears in the above-identified patent and that said Letters Patent is hereby corrected as shown below:

Column 6,
Line 9, delete "claim 4 wherein fabric" and replace with -- claim 4 wherein said fabric --.
Line 46, delete "sold" and replace with -- said --.
Line 47, delete "sold" and replace with -- said --.

Signed and Sealed this

Tenth Day of January, 2006

JON W. DUDAS
*Director of the United States Patent and Trademark Office*